US007913241B2

(12) United States Patent
Liu et al.

(10) Patent No.: US 7,913,241 B2
(45) Date of Patent: Mar. 22, 2011

(54) TECHNIQUES OF OPTIMIZING XQUERY FUNCTIONS USING ACTUAL ARGUMENT TYPE INFORMATION

(75) Inventors: Zhen Hua Liu, San Mateo, CA (US); Muralidhar Krishnaprasad, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1283 days.

(21) Appl. No.: 11/452,769

(22) Filed: Jun. 13, 2006

(65) Prior Publication Data

US 2007/0288429 A1    Dec. 13, 2007

(51) Int. Cl.
*G06F 9/45* (2006.01)
*G06F 7/00* (2006.01)

(52) U.S. Cl. ........ 717/151; 717/117; 717/143; 707/713; 707/755; 707/760; 707/765

(58) Field of Classification Search ........................ None
See application file for complete search history.

(56) References Cited

U.S. PATENT DOCUMENTS

| | | | | |
|---|---|---|---|---|
| 5,488,727 A * | 1/1996 | Agrawal et al. | ............... | 717/154 |
| 5,579,518 A * | 11/1996 | Yasumatsu | ............... | 717/131 |
| 5,696,973 A * | 12/1997 | Agrawal et al. | ............... | 717/154 |
| 5,696,974 A * | 12/1997 | Agrawal et al. | ............... | 717/152 |
| 5,717,911 A | 2/1998 | Madrid et al. | | |
| 6,009,428 A * | 12/1999 | Kleewein et al. | ............... | 1/1 |
| 6,085,035 A * | 7/2000 | Ungar | ............... | 717/116 |
| 6,149,318 A * | 11/2000 | Chase et al. | ............... | 717/131 |
| 6,356,887 B1 | 3/2002 | Berenson et al. | | |
| 6,356,889 B1 | 3/2002 | Lohman et al. | | |
| 6,536,889 B1 | 3/2003 | Biegelsen et al. | | |
| 6,560,774 B1 * | 5/2003 | Gordon et al. | ............... | 717/146 |
| 7,013,311 B2 | 3/2006 | Hui et al. | | |
| 7,099,858 B2 | 8/2006 | Aldrich et al. | | |
| 7,167,848 B2 | 1/2007 | Boulkouvalas et al. | | |
| 7,350,198 B2 * | 3/2008 | Kluger et al. | ............... | 717/140 |
| 7,359,922 B2 | 4/2008 | Young-Lai et al. | | |
| 7,454,413 B2 * | 11/2008 | Lakshminarayanan et al. | ...... | 1/1 |
| 7,530,080 B2 * | 5/2009 | Schulte et al. | ............... | 719/330 |
| 2002/0007375 A1 | 1/2002 | Ebata | | |
| 2002/0133497 A1 | 9/2002 | Draper et al. | | |
| 2003/0126590 A1 * | 7/2003 | Burrows et al. | ............... | 717/154 |
| 2004/0064466 A1 | 4/2004 | Manikutty et al. | | |
| 2004/0093344 A1 | 5/2004 | Berger et al. | | |

(Continued)

OTHER PUBLICATIONS

W3C, "XQuery 1.0: An XML Query Language", W3C Candidate Recommendation Nov. 3, 2005, located at http://www.w3.org/TR/2005/CR-xquery-20051103/, 225 pgs.

(Continued)

*Primary Examiner* — Tuan Q Dam
*Assistant Examiner* — Zheng Wei
(74) *Attorney, Agent, or Firm* — Hickman Palermo Truong & Becker LLP (57) ABSTRACT

A method for optimizing functions is described. A query including an invocation of a function is received. A function declaration indicates that the function is associated with a first set of datatypes. At compile-time, static type-checking is performed on the query. During the static type-checking, a second set of datatypes is determined for the function. The second set of datatypes includes the datatype of each argument of the function that is specified in the invocation. The query is compiled, where compiling the query includes compiling the function with the second set of datatypes.

38 Claims, 4 Drawing Sheets

U.S. PATENT DOCUMENTS

| | | | |
|---|---|---|---|
| 2004/0148278 A1 | 7/2004 | Milo et al. | |
| 2004/0194058 A1* | 9/2004 | Meijer et al. | 717/116 |
| 2004/0243555 A1 | 12/2004 | Bolsius et al. | |
| 2005/0055680 A1* | 3/2005 | Kluger et al. | 717/143 |
| 2005/0120029 A1 | 6/2005 | Tomic et al. | |
| 2005/0289125 A1* | 12/2005 | Liu et al. | 707/3 |
| 2006/0101011 A1 | 5/2006 | Lindsay et al. | |
| 2006/0130038 A1* | 6/2006 | Claussen et al. | 717/168 |

OTHER PUBLICATIONS

Leontiev, Yuri, et al., "On Type Systems for Object-Oriented Database Programming Languages", ACM computing surveys, vol. 34, No. 4, Dec. 2002, 41 pages.

* cited by examiner

*Fig. 1A*

100 Function Declaration of an Example User-Defined Function declare function local:add ( $x as item()?, $y as item()? ) as item()?
　　　　　　　　　　　　　　⎿___102___⎦ ⎿________104________⎦ ⎿__106__⎦
{
　return ($x + $y) ⎱ 108
}

TECHNIQUES OF OPTIMIZING XQUERY FUNCTIONS USING ACTUAL ARGUMENT TYPE INFORMATION

FIELD OF THE INVENTION

The present invention generally relates to Extensible Markup Language (XML). The invention relates more specifically to a method for optimizing XML Query Language (XQuery) functions by using actual argument type information.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Extensible Markup Language (XML) is a markup language that allows tagging of document elements and provides for the definition, transmission, validation, and interpretation of data between applications and between organizations. The XML specification was developed by the W3C consortium and is located on the Internet at "http://www.w3.org/xml", the entire contents of which is hereby incorporated by reference for all purposes as if fully set forth herein.

The XML Query Language (XQuery) is a query language that is designed for querying a broad spectrum of XML information resources, such as, for example, XML-enabled databases and XML documents. A draft specification for XQuery is described in "XQuery 1.0: An XML Query Language", W3C Candidate Recommendation 3 Nov. 2005, located at "http://www.w3.org/TR/xquery/", the entire contents of which is hereby incorporated by reference for all purposes as if fully set forth herein. The XQuery specification provides for built-in functions and also allows users to declare functions of their own. As referred to herein, a function is a set of code which is executed as a block and to which flow of execution can be passed from a calling entity, such as, for example, an expression or a query. Typically, a user-defined XQuery function is declared in a function declaration that is included in an XQuery module. A function declaration comprises the name of the function, the names and datatypes of the function input parameters, the datatype of the result, or return parameter, that is returned by the function, and a function body. The function body includes one or more expressions that define how the result of the function is computed based on the input parameters.

Figure 1A:
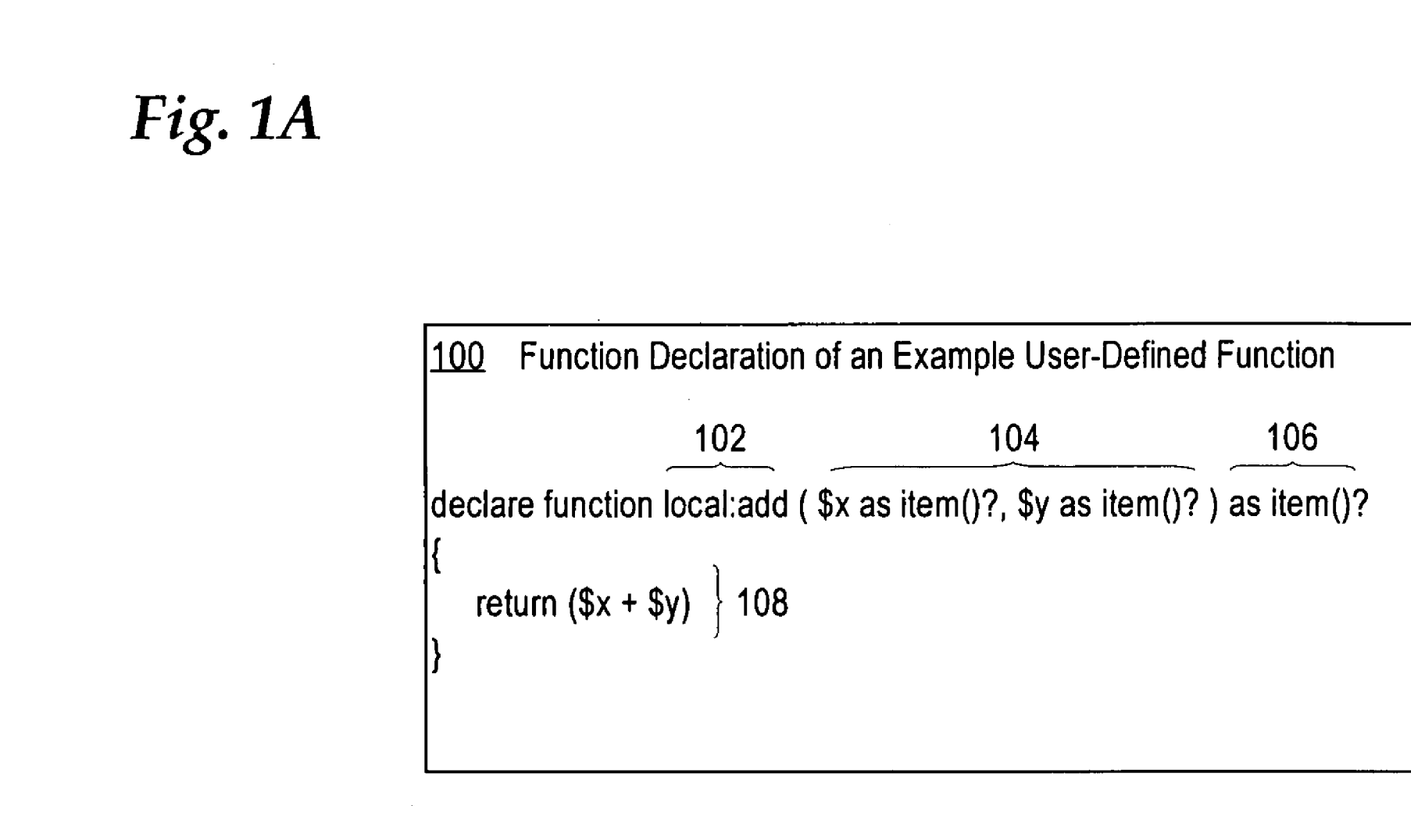
FIG. 1A is a block diagram that illustrates a function declaration of an example user-defined function that can be optimized according to one embodiment.

FIG. 1A is a block diagram that illustrates a function declaration of an example user-defined XQuery function. Function declaration 100 comprises function name 102, function input parameters 104 with their datatypes, datatype 106 of the return parameter of the function, and function body 108. In FIG. 1A, function name 102 is the Qualified Name (QName) "local:add". Input parameters 104 are parameter "$x" (of datatype "item( )?") and parameter "$y" (also of datatype "item( )?"). Datatype 106 of the return parameter of function "local:add" is the "item( )?" datatype. Function body 108 includes an expression that sums the values of the two input parameters ("($x+$y)"), and an expression ("return ( . . . )") that returns the sum of the two input parameters as the function result.

In general, a calling entity executes a function through a function invocation (also referred to as a function call). A function invocation generally includes a function name and a list of zero or more arguments, where the zero or more arguments correspond to input parameters specified in the function declaration. A function argument in an invocation is a value, or one or more expressions that evaluate to a value, and is typically associated with a datatype. When the function invocation is executed, the function is evaluated based on the arguments and, if no run-time errors are encountered, a value having the datatype of the return parameter of the function is returned to the calling entity. For example, a user-defined XQuery function may be executed from a query that includes an invocation, or call, to the function. Typically, the query includes the QName of the function followed by a parenthesized list of arguments. Each argument in the function invocation is bound to an input parameter declared in the function declaration of the XQuery function. If an invocation argument is based on one or more expressions, the one or more expressions are evaluated before control is passed to the function. The body of the XQuery function is then evaluated and a result value is returned to the query. The result value is either an instance of the datatype of the XQuery function's return parameter or an error.

The XQuery specification allows datatype overloading for XQuery functions, that is, XQuery functions may be declared with input and return parameters associated with generic or specific datatypes. As referred to herein, a generic datatype is a datatype that includes as a subtype at least one specific datatype which is derived directly or indirectly from the generic datatype. If a function input parameter is associated with a generic datatype in a function declaration of an XQuery function, then an argument of any specific datatype that is a subtype of the generic datatype can be properly passed in an invocation of the function. Similarly, if a function return parameter is associated with a generic datatype in the function declaration, then a return value of any specific datatype that is a subtype of the generic datatype can be properly returned from the function. In this way, the XQuery specification allows users to declare polymorphic functions, which are generally more simple and convenient to write.

Because of the convenience of function polymorphism, users tend to declare user-defined XQuery functions with generic datatypes (such as, for example, "item( )?", "item( )*", and "node( )+") for the input and return function parameters. The users then rely on the XQuery processor, which processes expressions or queries that call XQuery functions, to automatically determine the precise and more specific datatypes that are associated with function invocation arguments and function return values. However, evaluating XQuery functions that are declared with generic parameter datatypes is challenging and the techniques for processing invocations of such functions have several disadvantages.

One technique for processing invocations of XQuery functions declared with generic parameter datatypes is to resolve all datatypes at run-time. Since XQuery allows for dynamic (or run-time) type-checking, this technique defers the type-checking of the datatypes of the arguments passed in a function invocation to run-time, e.g. when the expression or query that calls the function is executed. (Type-checking generally refers to the process of resolving the datatypes of arguments or parameters in a given query or expression.) The disadvantage of this technique, however, is that it is very resource inefficient. For example, a computer system evaluating a query that includes an XQuery function declared with generic parameter datatypes may have expended a great deal of computing resources to materialize some or all of the XML data that is to be returned, only to discard all this data because of a run-time error that is generated because of a wrong datatype of an argument in a function invocation.

Another technique for processing invocations of XQuery functions declared with generic parameter datatypes is to resolve at least some datatypes at compile-time by performing static type-checking. (Static type-checking generally refers to type-checking that is performed at compile-time based on declared or specified datatypes.) However, because of the polymorphic nature of a user-defined XQuery function declared with generic parameter datatypes, it is not possible to know the exact datatypes of the arguments that will be passed in the invocations of the function. Thus, one disadvantage of the technique using static type-checking is that it does not provide for a good compile-time analysis of the underlying query or expression invoking the XQuery function since the static type-checking will raise a lot of datatype errors and warnings. Another disadvantage of this technique is that the generic datatype information indicated in the function declaration is not specific enough to provide for a good compile-time optimization of the query that includes the function invocation.

For example, consider the following example query, which invokes the "local:add" function depicted in FIG. 1A:

```
for $i in fn:collection('/public/pofolder/')
    return ( local:add(xs:date($i/po/@podate),
        xdt:dayTimeDuration('P3H')),
        local:add(xs:decimal($i/po/@ponum), 34) )
```

In the above example query, the "local:add" function is invoked in a "for" loop. In each iteration of the loop, the "local:add" function is invoked twice: once with arguments having a "xs:date" and "xdt:dayTimeDuration" datatypes, and once with arguments having "xs:decimal" datatypes. Thus, in each iteration of the loop, the "local:add" function is invoked once to add three days to a particular date that is located in an XML document at path "/public/pofolder/po/podate/", and once to add the number "34" to a particular number that is located in the XML document at path "/public/pofolder/po/ponum/".

As depicted in FIG. 1A, the "local:add" function declares the input and return parameters as having the generic datatype "item( )?". Thus, the "+" operator in the body of the function is polymorphic since it can be used for adding both numeric arguments and date and duration arguments when the function is invoked, as shown in the above example query. The binding of the "+" operator to its arguments is not known until the actual argument datatypes of the arguments in an invocation of the function are determined. Therefore, in order to evaluate an invocation of the "local:add" function, a query compiler has to compile big datatype switch clauses in the execution tree of the query. The switch clauses must account for every possible combination of all specific datatypes that are subtypes of the declared generic datatypes, and serve to dispatch a particular "+" operation in a particular function invocation based on the specific argument datatypes in that invocation. The compiling of big datatype switch clauses in the execution tree of the query, however, impedes execution performance especially if the function is invoked in a loop as shown in the above example query. Even if static type-checking is performed on the function during compile-time, the exact nature of the "+" operator still cannot be determined because the function parameters or return values are declared in the function declaration with generic datatypes.

Although the disadvantages of the known techniques for processing polymorphic functions are presented above with respect to XQuery, it is noted that these disadvantages are not unique to the XQuery language. Rather, these disadvantages are common to any declarative computer language that allows for dynamic type-checking.

Based on the foregoing, there is a clear need for techniques for effective static type-checking and optimization of functions that are declared in a computer language that allows dynamic type-checking.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In some embodiments, the techniques for optimizing functions described herein are implemented with respect to a declarative query language that allows for dynamic type-checking. According to these techniques, a query that includes an invocation of a function is received. A function declaration indicates that the function is associated with a first set of datatypes. At compile-time, static type-checking is performed on the query. During the static type-checking, a second set of datatypes is determined for the function. The second set of datatypes includes the datatype of each argument of the function that is specified in the invocation. A copy of the function is generated. The copy of the function is annotated with the second set of datatypes instead of the first set of datatypes that is specified in the function declaration. The copy of the function is then stored in a function instantiation cache. The query is compiled, where compiling the query includes compiling the copy of the function that is annotated with the second set of datatypes and is stored in the function instantiation cache. Thereafter, the compiled copy of the function is invoked when the invocation of the function is executed during the execution of the query.

In these embodiments, according to the techniques described herein the first set of datatypes includes the datatypes of input and/or return parameters of the function, and the second set of datatypes includes the datatype of each argument passed in a function invocation. Thus, the techniques described herein provide for performing, at compile-time, type-checking on the function by using the actual argument datatypes instead of the parameter datatypes declared in the function invocation. In this way, a determination is made at compile-time regarding the exact datatypes of the arguments that are passed in the function invocation as well as the datatypes of all return values from the function.

In one embodiment, the techniques for optimizing functions described herein are implemented for user-defined XQuery functions that are invoked from XQuery queries or expressions. In other embodiments, the techniques described herein may be implemented for any declarative computer language that allows for dynamic type-checking of argument or parameter datatypes. Examples of such computer languages include, but are not limited to, SmallTalk, Python, Perl, and Objective-C.

In different embodiments, the techniques described herein may be implemented by software and/or hardware components in a variety of computer systems. For example, in one embodiment the techniques for optimizing functions described herein may be performed by one or more components of an XQuery processor that is executing in an application server. In another embodiment, the techniques described herein may be performed by a query compiler and/or query processor in a database server. In other embodiments, the techniques described herein may be performed by software and/or hardware components in any now known or later developed computer system that is capable of processing expressions or queries with function invocations including, but not limited to, web servers, print servers, e-mail servers, mobile application servers, operating systems, on-line analytical processing (OLAP) systems, on-line transaction processing (OLTP) systems, and data warehousing systems. Further, the software and/or hardware components performing the techniques described herein may be implemented in their respective computer systems in a variety of ways including, but not limited to, standalone applications, libraries of functions, dynamically linked libraries, and user or system processes or threads.

Thus, the techniques for optimizing functions described herein are not limited to being implemented for any particular programming language by any particular type of computer system, and for this reason the embodiments of the techniques described herein are to be regarded in an illustrative rather than a restrictive sense.

Functional Overview

Figure 2:
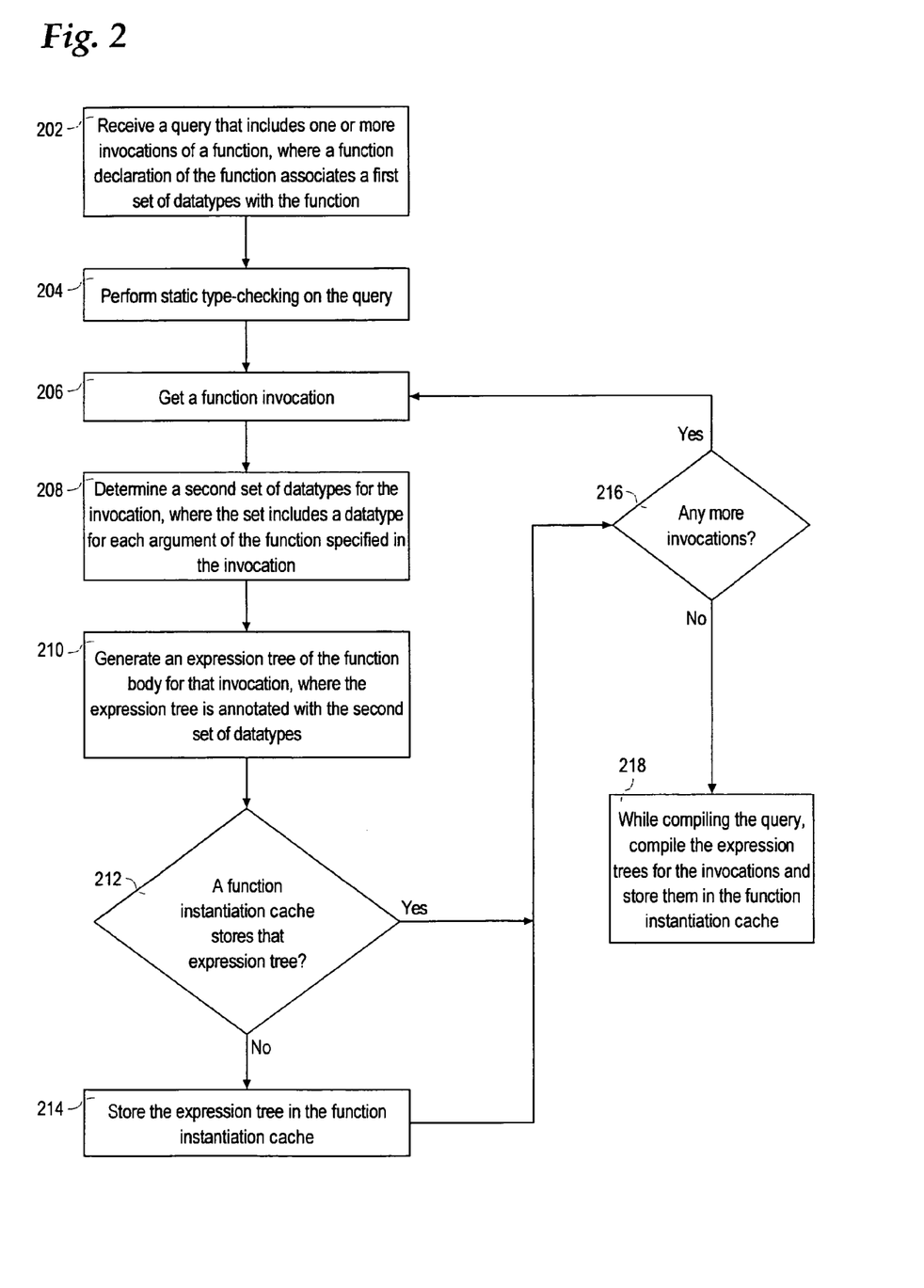
FIG. 2 is a flow diagram that illustrates an overview of a method for optimizing functions according to one embodiment.

FIG. 2 is a flow diagram that illustrates an overview of a method for optimizing functions according to one embodiment.

A query is received in step 202. The query includes one or more invocations of a function, where a function declaration of the function associates a first set of datatypes with the function. The first set of datatypes includes the datatype of each input and/or return parameter of the function.

In step 204, static type-checking is performed on the query. As part of static type-checking the query, each function invocation included in the query is processed according to steps 208 to 216. In some embodiments, before performing steps 208 to 216, one or more optimization conditions are evaluated and/or considered to determine whether to optimize the function invocations according to steps 208 to 216. In these embodiments, steps 208 to 216 are performed if a determination is made that one or more optimization conditions are satisfied. Examples of such optimization conditions are described in a separate section hereinafter.

According to the techniques described herein, in step 208 a second set of datatypes is determined for a particular function invocation. The second set of datatypes includes the datatype of each argument passed in that function invocation. In step 210, a copy of the function that corresponds to that function invocation is generated. In the embodiment described in FIG. 2, the copy of the function is an expression tree of the function body, where the expression tree is annotated with the second set of datatypes instead of the first set of datatypes. In this embodiment, the expression tree of the function body that is annotated with the second set of datatypes may be generated by first generating an expression tree that is annotated with the first set of datatypes, and then modifying only those portions of the tree that are affected by a datatype change. In other embodiments, the copy of the function annotated with the second set of datatypes may be any internal representation of the function on the basis of which the function is later compiled. In this way, the datatypes of the actual arguments that are passed to the function in that invocation are used to compile the function instead of the parameter datatypes that are specified in the function declaration.

In step 212, a determination is made of whether a function instantiation cache stores the expression tree of the function body that is annotated with the second set of datatypes. If a determination is made that that the function instantiation cache already stores that expression tree of the function body, then processing continues at step 216. If in step 212 a determination is made that that the function instantiation cache does not store that expression tree of the function body, then in step 214 that expression tree is stored in the function instantiation cache.

In step 216, a determination is made whether the query being type-checked includes any more invocations of that function. If a determination is made that the query includes more function invocations, then in step 206 the next function invocation is accessed and processed. In this manner, the techniques described herein provide for processing all function invocations included in the query. Further, if the query invokes more than one function, then the invocations of each function may also be processed in the same way.

If in step 216 a determination is made that all function invocations in the query are processed, then in step 218 the query is compiled. In the process of compiling the query, any expression trees that are stored in the function instantiation cache are also compiled.

In some embodiments, in step 218 the query is compiled into an execution tree. In these embodiments, any expression trees corresponding to function invocations are compiled into execution trees and are stored back in the function instantiation cache; thereafter, each function invocation in the execution tree of the query is annotated to point to the corresponding invocation execution tree in the function instantiation cache. Thereafter, during the execution of the query, a function invocation is executed based on the corresponding invocation execution tree in the function instantiation cache, where the corresponding execution tree was compiled based on an expression tree of the function body that is annotated with the datatypes of the actual arguments that are passed into that particular invocation. In this way, the need to perform dynamic type-checking on a function invocation during the execution of the query is either entirely avoided or greatly minimized.

While FIG. 2 describes an embodiment in which a query is type-checked and compiled, the techniques for optimizing functions described herein are not restricted to being implemented with respect to queries only. Rather, the techniques described herein may be implemented for any expression, module, or other set of code which a computer system is capable of compiling and/or executing. Thus, the embodiment described in FIG. 2 is to be regarded in an illustrative rather than a restrictive sense.

Function Instantiation Cache

The techniques described herein provide for a function instantiation cache which stores copies, or instances, of functions that are annotated with actual argument datatypes. In some embodiments, the copies of the functions are expression trees of the function bodies that are annotated with argument datatypes indicated in different function invocations. In other embodiments, the copies of the functions may be any internal function representations with datatype indications on the basis of which the functions may be compiled. In some embodiments, the function instantiation cache is a data structure that is stored in volatile memory for faster access. In other embodiments, the function instantiation cache may be stored in any computer-readable medium including, but not limited to, processor caches and any type of persistent or transient machine-readable storage.

Figure 1B:
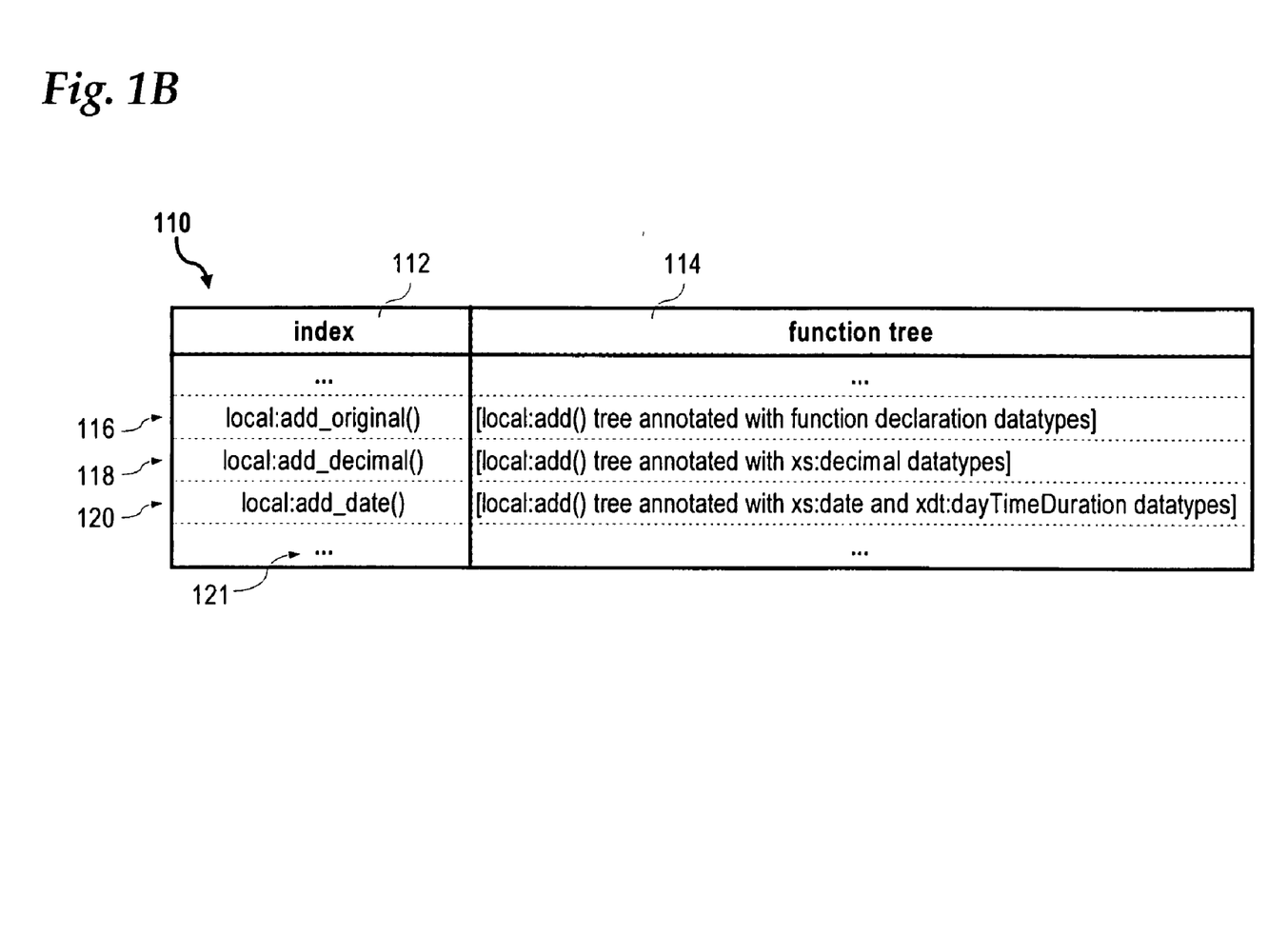
FIG. 1B is a block diagram that illustrates a function instantiation cache according to one embodiment.

FIG. 1B is a block diagram that illustrates a function instantiation cache according to one embodiment. Function instantiation cache 110 stores a set of items, such as items 116, 118, and 120, where each item represents, and corresponds to, a function invocation with its set of invocation argument datatypes. Ellipsis 121 indicate that function instantiation cache 110 may store an arbitrary number of such items.

In the embodiment depicted in FIG. 1B, function instantiation cache 110 is organized as a table that includes at least index column 112 and function tree column 114. Each item in the function instantiation cache 110 is indexed by a key that is stored in index column 112. In the embodiment depicted in FIG. 1B, the key comprises the function name and the name or names of the datatypes of the arguments that are passed in the function invocation represented by a particular item. In other embodiments, the key stored in the index column 112 may comprise any identifier or a combination of identifiers that is capable of uniquely distinguishing among different invocations of the same or different functions. According to the techniques described herein, the key values stored in index column 112 are used to determine whether a particular invocation of a function with particular argument datatypes is stored in function instantiation cache 110.

In the embodiment depicted in FIG. 1B, function tree column 114 stores the content of annotated function body expression trees and execution trees for function invocations that are represented by the items stored in function instantiation cache 110. In some embodiments, the expression trees and execution trees of function invocations represented by cache items may be stored in separate columns that are indexed by the same key stored in index column 112.

In different embodiments, the techniques for optimizing functions described herein may utilize a function instantiation cache that is organized in any now known or later developed caching data structures including, but not limited to, relational tables, object-based storage, and name-value pairs. In addition, the techniques described herein may utilize any now known or later developed cache management mechanisms to manage the items in the function instantiation cache including, but not limited to, mechanisms for purging the cache of stale items and mechanisms for per-column indexing of cache items.

An Example of Optimizing an XQuery Function

In one embodiment, the techniques for optimizing functions described herein are implemented for XQuery functions. More specifically, during the compilation of a query, the techniques described herein are used to optimize user-defined XQuery functions that are invoked from the query.

For example, the following example query invokes the "local:add" function depicted in FIG. 1A:

```
for $i in fn:collection('/public/pofolder/')
    return ( local:add(xs:date($i/po/@podate),
        xdt:dayTimeDuration('P3H')),
        local:add(xs:decimal($i/po/@ponum), 34) )
```

According to the techniques described herein, a static type-checking on the "local:add" function body is performed with the declared "item( )?" parameter datatypes during the static type-checking of the above example query. In this way, any datatype errors and warnings with respect to the declared parameter datatypes are caught and processed. In one embodiment, if the static type-checking of the function body with the declared parameter datatypes is successful, an expression tree of the function body annotated with the declared parameter datatypes is stored in the function instantiation cache. (As depicted in FIG. 1B, item 116 in function instantiation cache 110 stores such an expression tree indexed under key "local: add_original( )".)

Thereafter, for each invocation of the "local:add( )" function from within the query, the argument datatype of each argument passed in that invocation is determined. The function instantiation cache is checked to determine whether a copy of the "local:add( )" function with that set of argument datatypes is stored in the cache. The check against the function instantiation cache is made based on the function name and the names or identifiers of the argument datatypes included in the set of argument datatypes for that invocation. If such a copy of the function (e.g. an expression tree of the function body annotated with that set of argument datatypes) is not stored in the cache, then the function body of the "local:add( )" function is type-checked with the actual argument datatypes. In this way, any datatype errors and warnings with respect to the actual argument datatypes in that invocation are caught and processed. If the type-check of the function body with the actual argument datatypes is successful, then an expression tree of the function body is generated and is annotated with these actual argument datatypes. The expression tree is then stored as an item in the function instantiation cache; the item is indexed by a key which indicates the function name and the names or identifiers of the actual argument datatypes for that invocation.

In this way, after the type-checking of the above query is completed, at least two copies of the "local:add" function are stored or added in the function instantiation cache. The first copy is a function body expression tree that is annotated with "xs:date" and "xdt:dayTimeDuration" datatypes for input arguments that are bound to the "$x" and "$y" input parameters, respectively. This expression tree is also annotated with the "xs:date" datatype for the result value of the function that is bound to the function return parameter. Hence, the "+" operator in this expression tree is bound to arguments of the "xs:date" and "xdt:dayTimeDuration" datatypes and returns a value of the "xs:date" datatype. (As depicted in FIG. 1B, item 120 in function instantiation cache 110 stores such an expression tree indexed under key "local:add_date( )".)

The second copy is a function body expression tree that is annotated with "xs:decimal" and "xs:decimal" datatypes for input arguments that are bound to the "$x" and "$y" input parameters, respectively. This expression tree is also annotated with the "xs:decimal" datatype for the result value of the function that is bound to the function return parameter. Hence, the "+" operator in this expression tree is bound to arguments of the "xs:decimal" datatype and returns a value of the "xs:decimal" datatype. (As depicted in FIG. 1B, item 118 in function instantiation cache 110 stores such an expression tree indexed under key "local:add_decimal( )".)

During the compilation (or code generation) phase of the above example query, each item representing an invocation-specific function body expression tree is fetched from the function instantiation cache. Each function body is then compiled into an execution tree based on the datatypes which are annotated in the expression tree for that function body. Each execution tree is then stored in the function instantiation cache. Then, for each function invocation in the query, the execution tree or code of the query is annotated (e.g. by using a pointer) to the location of the corresponding function body execution tree in the function instantiation cache.

When the query is executed, each function invocation in the query is executed based on the function body execution tree stored in the function instantiation cache that corresponds to that invocation and that is based on the datatypes of the actual arguments passed in that invocation. In this way, there is no need to perform type-checking on the function body at run-time when the query is executed.

In effect, according to the techniques described herein, the execution of the above example query amounts to executing the following equivalent query:

```
for $i in fn:collection('/public/pofolder/')
    return ( local:add_date(xs:date($i/po/@podate),
        xdt:dayTimeDuration('P3H')),
        local:add_decimal(xs:decimal($i/po/@ponum), 34) )
```

The equivalent query, however, is not materialized and is not declared in any function declaration written by a user. Rather, the techniques described herein provide for automatically converting the function invocations in the query from function invocations that are based on the declared parameter datatypes to function invocations that are based on the datatypes of the actual arguments passed in the invocations.

Optimization Conditions Based on Generic Parameter Datatypes

One context in which the techniques described herein may be implemented is for optimizing functions that are declared with generic parameter datatypes in their function declarations. As referred to herein, a generic datatype is a datatype that includes as a subtype at least one specific datatype, which specific datatype is derived directly or indirectly from the generic datatype. As referred to herein, a specific datatype is a datatype that is derived directly or indirectly from one or more generic datatypes.

In embodiments described herein with respect to XQuery, a specific datatype may be derived from a generic datatype in a variety of ways, such as, for example, by restricting the generic datatype, by enumerating, or listing, instances of the generic datatype, and by extending and restricting the generic datatype.

Generic datatypes that may be used in XQuery functions according to these embodiments include, but are not limited to, schema datatypes defined according to an XML Schema specification (such as, for example, the draft XML Schema specification "XML Schema Part 2: Datatypes Second Edition", W3C Recommendation 28 Oct. 2004, located at "http://www.w3.org/TR/xmlschema-2/", the entire contents of which is hereby incorporated by reference for all purposes as if fully set forth herein), sequence datatypes defined according to an XQuery/XPath Data Model specification (such as, for example, the draft XQuery/XPath Data Model specification "XQuery 1.0 and XPath 2.0 Data Model", W3C Candidate Recommendation 3 Nov. 2005, located at "http://www.w3.org/TR/xpath-datamodel/", the entire contents of which is hereby incorporated by reference for all purposes as if fully set forth herein), and atomic datatypes that represent both schema and sequence datatypes. Examples of generic datatypes include, but are not limited to, the "xs:anyType" and "xs:anySimpleType" XML Schema datatypes; the "item( )", "node( )", "sequence( )", and "element( )" XQuery/XPath Data Model datatypes; and the "xs:decimal" and "xs:string" atomic datatypes. One example of a specific datatype is the "xs:integer" datatype which is derived by restriction directly from the "xs:decimal" XML Schema atomic datatype. Another example of a specific datatype is the "xs:byte" datatype which is derived by restriction indirectly from the "xs:integer" XML Schema atomic datatype.

In some embodiments, the techniques for optimizing functions described herein provide for determining whether one or more optimization conditions are satisfied before actually optimizing a particular function. The optimization conditions may be used to control the size of the function instantiation cache and/or to ensure that the techniques described herein are performed only when they provide performance or other tangible benefits. If such one or more optimization conditions are satisfied, then the particular function may be optimized according to the techniques described herein.

In some embodiments, the optimization conditions may be based on the presence or absence of function parameters declared with generic datatypes in a function declaration of a particular function. For example, in one embodiment an optimization condition is satisfied if at least one (and possibly more) input parameter is declared with a generic datatype in a given function declaration. In this embodiment, the techniques described herein are performed for an expression or a query that includes at least one (and possibly more) invocations of the function, where the invocation or invocations include an argument that is bound to the input parameter and that has a specific datatype. For example, in this embodiment the optimization condition is satisfied for the function depicted in FIG. 1A since both of the functions input parameters ("$x" and "$y") are declared with the generic datatype of "item( )?".

In one embodiment, an optimization condition is satisfied if at least one (and possibly more) return parameter of a function is declared with a generic datatype in the function declaration. In this embodiment, the techniques described herein are performed for an expression or a query that includes at least one (or possibly more) invocations of the function, where the invocation or invocations return a value that is bound as the result value of the function and that has a specific datatype. For example, in this embodiment the optimization condition is satisfied for the function depicted in FIG. 1A since the return parameter of the function is declared with the generic datatype of "item( )?". Use of such optimization condition may be useful in expressions or queries in which an input parameter of a first function is actually the result of a function invocation of a second function.

In one embodiment, an optimization condition may be based at least in part on a compile-time analysis of the different invocations of a function. In this embodiment, the optimization condition may be satisfied if a compile-time analysis, which is based on the datatypes of the actual arguments passed in multiple invocations of the function, indicates that the result value of the function has a different datatype for each invocation and depends on the datatypes of the actual arguments.

To put it differently, in this embodiment the optimization condition is not satisfied if the result value (or the return parameter) of the function has a fixed datatype that does not depend on the datatypes of the arguments that are passed in any invocation of the function. For example, the optimization condition is not satisfied if all function invocations in an expression or a query always return a value of a "string" datatype. When the compile-time analysis of the function body indicates that the result of the function does not depend tightly on the datatypes of the arguments passed in any invocation, then it may not be beneficial to instantiate, and store in the function instantiation cache, copies of the function for the different and distinct sets of argument datatypes for each invocation. Instead, in this embodiment such cases are handled by compiling and storing only one copy of the function that is annotated with the parameter datatypes that are declared in the function declaration.

Additional Features and Embodiments

In some embodiments, in order to minimize the number of function copies that need to be stored in a function instantiation cache, the techniques described herein provide for promoting the datatypes of some or all of the actual arguments used in function invocations to broader datatypes. For example, instead of creating and storing in the function instantiation cache a different function copy for each invocation that uses an argument datatype that is a derivative of a built-in numeric datatype (e.g. instead of using a different function copy for actual argument datatypes of "xs:integer", "xs:negativeInteger", "xs:positiveInteger", "xs:long", "xs:byte", etc.), the techniques described herein provide for storing one copy of the function body that is type-checked with the "xs:decimal" datatype, which is the broadest numeric built-in datatype. This approach of generalizing an actual argument datatype to a broader built-in datatype solves a cache sizing issue that may arise when a function is declared with generic parameter datatypes in its function declaration, and an expression or a query includes numerous function invocations with arguments of numerous more specific datatypes, which would result in storing many copies of the function body in the function instantiation cache.

In some embodiments, the size of the function instantiation cache is bound by the variations in the argument datatypes that are used in the different function invocations of a function. Thus, the size of the function instantiation cache is a constant value that can be determined at compile-time. In these embodiments, the techniques described herein may provide for fine-tuning and reducing the size of the function instantiation cache by determining and analyzing the differences of the function body expression trees before they are installed in the cache. For example, if it is determined that an invocation of a function "F( )", which is declared with a parameter of datatype "xs:date", yields the same datatype-annotated expression tree that has been generated for an invocation of the function with an argument of "xs:decimal" datatype, then a second item may be added in the function instantiation cache where the key of the second item is "F(xs:date)" and the body of the function points to the function body expression tree that is stored for the item representing "F(xs:decimal)". In this way, the techniques described herein can effectively control the size of the function instantiation cache and can improve the execution performance during both compile-time and run-time.

In addition, in these embodiments the analysis of the differences between separate function body expression trees that are to be stored in the function instantiation cache can be more intelligent in determining the approximate or exact amount of optimization that is to be gained by performing the techniques described herein with respect to a particular function. If it is determined that the amount of optimization would not be extensive, then different items may be stored in the function instantiation cache to represent the different function invocations, but all of the items may be set to point to the function body expression tree that is type-checked with the declared parameter datatypes. Thus, the described techniques for optimizing functions based on the actual argument datatypes may be implemented in a completely flexible and adaptive way.

Hardware Overview

Figure 3:
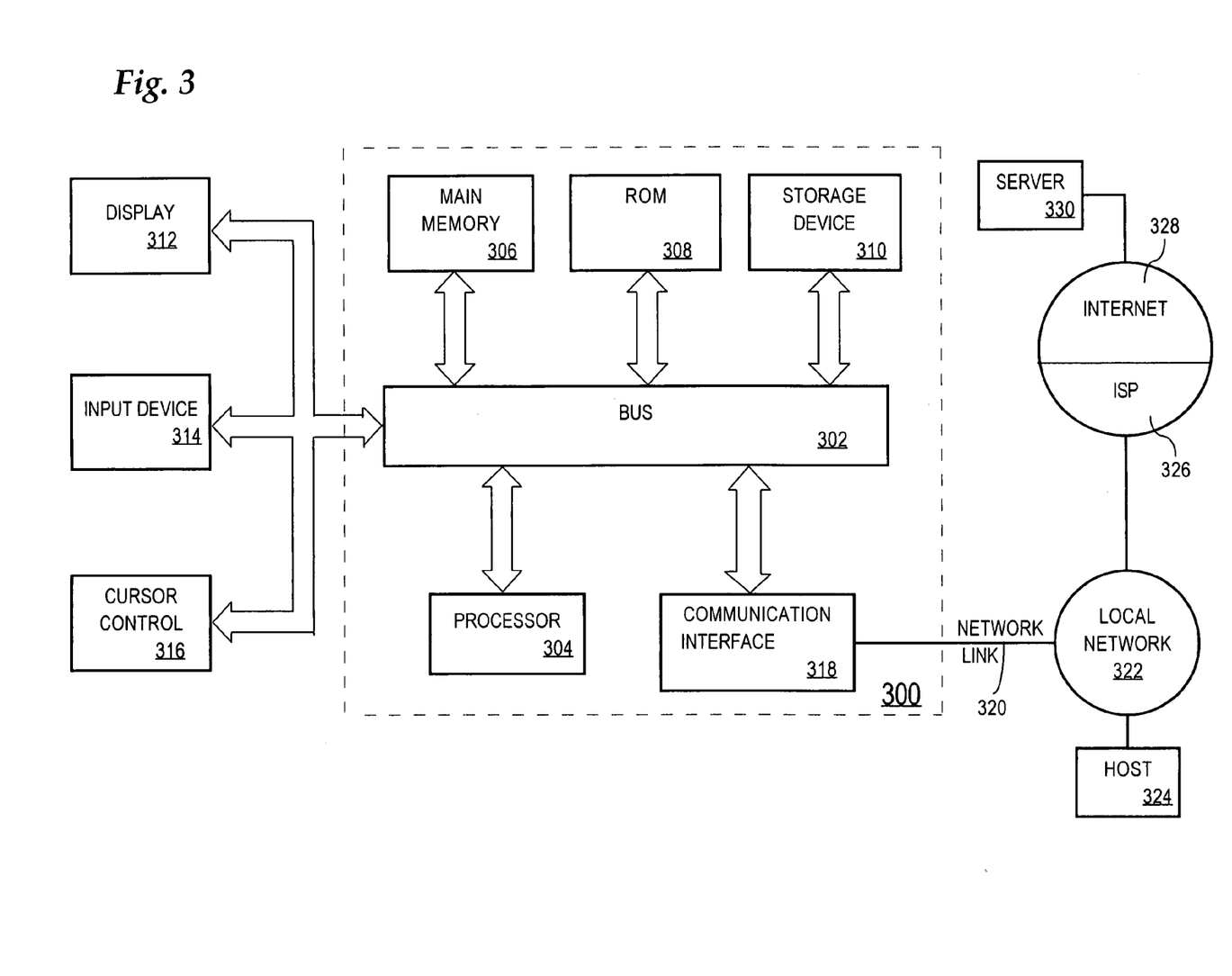
FIG. 3 is a block diagram that illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for optimizing functions expressed in a declarative computer language that allows for dynamic type-checking, the method comprising the computer-implemented steps of:

receiving a query that includes an invocation of a function, wherein a function declaration of the function indicates that a first set of datatypes is associated with the function;

performing static type-checking on the query, wherein performing static type-checking on the query comprises performing static type-checking on the function, wherein performing static type-checking on the function comprises determining a second set of datatypes for the function, wherein the second set of datatypes includes a datatype of each argument of the function specified in the invocation;

wherein the second set of datatypes is different than the first set of datatypes; and compiling the query, wherein compiling the query comprises compiling the function with the second set of datatypes;

wherein the steps of the method are performed by one or more computer systems.

2. The method of claim 1, wherein:

the step of determining the second set of datatypes further comprises determining at least one specific datatype of at least one return value of the function by type-checking the function based on one or more datatypes of one or more input arguments specified in the invocation of the function, wherein the at least one specific datatype is included in the second set of datatypes; and the step of performing static type-checking on the function further comprises generating a new copy of the function, wherein the new copy of the function is type-checked and compiled with the second set of datatypes instead of the first set of datatypes.

3. The method of claim 2, wherein:
the step of performing static type-checking on the function further comprises storing the new copy of the function in a function instantiation cache.

4. The method of claim 2, wherein:
the step of compiling the query comprises replacing the invocation of the function in the query with a new invocation of the new copy of the function which is type-checked and compiled with the second set of datatypes.

5. The method of claim 1, wherein the query is an XML Query Language (XQuery) query, and the function is a user-defined XQuery function that is defined in one of the query and an XQuery module.

6. The method of claim 1, wherein the first set of datatypes comprises a datatype of each input parameter and each return value of the function that are specified in the function declaration.

7. The method of claim 1, wherein the second set of datatypes further includes at least one specific datatype of at least one return value which would be returned when the invocation of the function is executed.

8. The method of claim 3, wherein the new copy of the function is an expression tree of the function body that is type-checked and compiled with the second set of datatypes.

9. The method of claim 8, wherein the step of generating the new copy of the function comprises:
generating the expression tree of the function body; and
performing static type-checking and compiling the expression tree of the function body by using the second set of datatypes.

10. The method of claim 1, wherein during the execution of the query the invocation of the function executes the compiled function.

11. The method of claim 1, further comprising:
determining whether at least one optimization condition is satisfied; and
performing the step of compiling the function with the second set of datatypes only when the at least one optimization condition is satisfied.

12. The method of claim 11, wherein:
the first set of datatypes comprises a datatype of each input parameter of the function specified in the function declaration; and
the at least one optimization condition is satisfied when the second set of datatypes includes at least one datatype that is a subtype of a generic datatype in the first set of datatypes, wherein the generic datatype is associated with at least one input parameter of the function.

13. The method of claim 11, wherein:
the first set of datatypes includes at least one datatype of at least one return value of the function that is specified in the function declaration; and
the at least one optimization condition is satisfied when the second set of datatypes includes at least one datatype that is a subtype of the at least one datatype of the at least one return value of the function.

14. The method of claim 11, wherein:
the invocation is one of a plurality of invocations of the function that are included in the query; and
the at least one optimization condition is satisfied when a compile-time analysis indicates that a return value, which has a different datatype than a datatype of a return parameter of the function specified in the function declaration, would be returned from at least one of the plurality of invocations of the function that are included in the query.

15. The method of claim 3, wherein the step of performing static type-checking on the function further comprises:
determining whether the function instantiation cache already stores the new copy of the function that is type-checked and compiled with the second set of datatypes; and
performing the step of storing the new copy of the function only when the function instantiation cache does not already store the new copy of the function.

16. A method for optimizing XML Query Language (XQuery) functions, comprising the computer-implemented steps of:
receiving an XQuery query that includes one or more invocations of a function, wherein a function declaration of the function indicates that a first set of datatypes is associated with the function, wherein the first set of datatypes comprises a datatype of each parameter of the function specified in the function declaration;
performing static type-checking on the XQuery query, wherein performing static type-checking comprises:
for each invocation of the one or more invocations of the function:
determining a second set of datatypes for said each invocation, wherein the second set of datatypes includes a datatype of each argument of the function specified in said each invocation;
wherein the second set of datatypes is different than the first set of datatypes;
generating an expression tree of the function body of the function for said each invocation, wherein the expression tree is type-checked and compiled with the second set of datatypes for said each invocation instead of the first set of datatypes; and
storing the expression tree of the function body for said each invocation in a function instantiation cache; and
compiling the XQuery query, wherein compiling the XQuery query comprises compiling each expression tree generated for each of the one or more invocations of the function that are included in the XQuery query;
wherein the steps of the methods are performed by one or more computer systems.

17. The method of claim 16, further comprising:
for each invocation of the one or more invocations of the function, before storing the expression tree of the function body for said each invocation, performing the step of:
based on an identifier of the function and on identifiers of the second set of datatypes for said each invocation, determining whether the function instantiation cache already stores the expression tree for said each invocation.

18. The method of claim 16, wherein performing static type-checking on the XQuery query further comprises:
generating a particular expression tree of the function body of the function, wherein the particular expression tree is type-checked and compiled with the first set of datatypes; and
storing the particular expression tree of the function body in the function instantiation cache.

19. The method of claim 16, wherein:
compiling each expression tree generated for each of the one or more invocations of the function that are included in the XQuery query further comprises:
for each expression tree stored in the function instantiation cache, generating an execution tree for the function based on said each expression tree; and storing each execution tree generated for the function in the function instantiation cache; and during the execution of the query, each invocation of the one or more invocations of the function is executed based on the execution tree stored in the function instantiation cache that corresponds to said each invocation.

20. A non-transitory computer-readable storage medium storing one or more sequences of instructions for optimizing functions expressed in a declarative computer language that allows for dynamic type-checking, wherein, when executed by one or more processors, the one or more sequences of instructions cause the one or more processors to perform steps comprising:

receiving a query that includes an invocation of a function, wherein a function declaration of the function indicates that a first set of datatypes is associated with the function;

performing static type-checking on the query, wherein performing static type-checking on the query comprises performing static type-checking on the function, wherein performing static type-checking on the function comprises determining a second set of datatypes for the function, wherein the second set of datatypes includes a datatype of each argument of the function specified in the invocation;

wherein the second set of datatypes is different than the first set of datatypes; and compiling the query, wherein compiling the query comprises compiling the function with the second set of datatypes.

21. The non-transitory computer-readable storage medium of claim 20, wherein:

the instructions that cause the one or more processors to perform determining the second set of datatypes further comprise instructions which, when executed by the one or more processors, cause the one or more processors to perform determining at least one specific datatype of at least one return value of the function by type-checking the function based on one or more datatypes of one or more input arguments specified in the invocation of the function, wherein the at least one specific datatype is included in the second set of datatypes; and the instructions that cause the one or more processors to perform performing static type-checking on the function further comprise instructions which, when executed by the one or more processors, cause the one or more processors to perform generating a new copy of the function, wherein the new copy of the function is type-checked and compiled with the second set of datatypes instead of the first set of datatypes.

22. The non-transitory computer-readable storage medium of claim 21, wherein:

the instructions that cause the one or more processors to perform static type-checking on the function further comprise instructions which, when executed by the one or more processors, cause the one or more processors to perform storing the new copy of the function in a function instantiation cache.

23. The non-transitory computer-readable storage medium of claim 21, wherein:

the instructions that cause the one or more processors to perform compiling the query comprise instructions which, when executed by the one or more processors, cause the one or more processors to perform replacing the invocation of the function in the query with a new invocation of the new copy of the function which is type-checked and compiled with the second set of datatypes.

24. The non-transitory computer-readable storage medium of claim 20, wherein the query is an XML Query Language (XQuery) query, and the function is a user-defined XQuery function that is defined in one of the query and an XQuery module.

25. The non-transitory computer-readable storage medium of claim 20, wherein the first set of datatypes comprises a datatype of each input parameter and each return value of the function that are specified in the function declaration.

26. The non-transitory computer-readable storage medium of claim 20, wherein the second set of datatypes further includes at least one specific datatype of at least one return value which would be returned when the invocation of the function is executed.

27. The non-transitory computer-readable storage medium of claim 22, wherein the new copy of the function is an expression tree of the function body that is type-checked and compiled with the second set of datatypes.

28. The non-transitory computer-readable storage medium of claim 27, wherein the instructions that cause the one or more processors to perform generating the new copy of the function comprise instructions which, when executed by the one or more processors, cause the one or more processors to perform:

generating the expression tree of the function body; and performing static type-checking and compiling the expression tree of the function body by using the second set of datatypes.

29. The non-transitory computer-readable storage medium of claim 20, wherein during the execution of the query the invocation of the function executes the compiled function.

30. The non-transitory computer-readable storage medium of claim 20, wherein the one or more sequences of instructions further comprise instructions which, when executed by the one or more processors, cause the one or more processors to perform:

determining whether at least one optimization condition is satisfied; and compiling the function with the second set of datatypes only when the at least one optimization condition is satisfied.

31. The non-transitory computer-readable storage medium of claim 30, wherein:

the first set of datatypes comprises a datatype of each input parameter of the function specified in the function declaration; and the at least one optimization condition is satisfied when the second set of datatypes includes at least one datatype that is a subtype of a generic datatype in the first set of datatypes, wherein the generic datatype is associated with at least one input parameter of the function.

32. The non-transitory computer-readable storage medium of claim 30, wherein:

the first set of datatypes includes at least one datatype of at least one return value of the function that is specified in the function declaration; and the at least one optimization condition is satisfied when the second set of datatypes includes at least one datatype that is a subtype of the at least one datatype of the at least one return value of the function.

33. The non-transitory computer-readable storage medium of claim 30, wherein:

the invocation is one of a plurality of invocations of the function that are included in the query; and the at least one optimization condition is satisfied when a compile-time analysis indicates that a return value, which has a different datatype than a datatype of a return parameter of the function specified in the function declaration, would be returned from at least one of the plurality of invocations of the function that are included in the query.

34. The non-transitory computer-readable storage medium of claim 22, wherein the instructions that cause the one or more processors to perform static type-checking on the function further comprise instructions which, when executed by the one or more processors, cause the one or more processors to perform:
  determining whether the function instantiation cache already stores the new copy of the function that is type-checked and compiled with the second set of datatypes; and
  storing the new copy of the function in the function instantiation cache only when the function instantiation cache does not already store the new copy of the function.

35. A non-transitory computer-readable storage medium storing one or more sequences of instructions for optimizing XML Query Language (XQuery) functions, wherein, when executed by one or more processors, the one or more sequences of instructions cause the one or more processors to perform steps comprising:
  receiving an XQuery query that includes one or more invocations of a function, wherein a function declaration of the function indicates that a first set of datatypes is associated with the function, wherein the first set of datatypes comprises a datatype of each parameter of the function specified in the function declaration;
  performing static type-checking on the XQuery query, wherein performing static type-checking comprises:
    for each invocation of the one or more invocations of the function:
      determining a second set of datatypes for said each invocation, wherein the second set of datatypes includes a datatype of each argument of the function specified in said each invocation;
      wherein the second set of datatypes is different than the first set of datatypes;
      generating an expression tree of the function body of the function for said each invocation, wherein the expression tree is type-checked and compiled with the second set of datatypes for said each invocation instead of the first set of datatypes; and
      storing the expression tree of the function body for said each invocation in a function instantiation cache; and
  compiling the XQuery query, wherein compiling the XQuery query comprises compiling each expression tree generated for each of the one or more invocations of the function that are included in the XQuery query.

36. The non-transitory computer-readable storage medium of claim 35, wherein the one or more sequences of instructions further comprise instructions which, when executed by the one or more processors, cause the one or more processors to perform:
  for each invocation of the one or more invocations of the function, before storing the expression tree of the function body for said each invocation, performing the step of:
    based on an identifier of the function and on identifiers of the second set of datatypes for said each invocation, determining whether the function instantiation cache already stores the expression tree for said each invocation.

37. The non-transitory computer-readable storage medium of claim 35, wherein the instructions that cause the one or more processors to perform static type-checking on the XQuery query further comprise instructions which, when executed by the one or more processors, cause the one or more processors to perform:
  generating a particular expression tree of the function body of the function, wherein the particular expression tree is type-checked and compiled with the first set of datatypes; and
  storing the particular expression tree of the function body in the function instantiation cache.

38. The non-transitory computer-readable storage medium of claim 35, wherein:
  the instructions that cause the one or more processors to perform compiling each expression tree generated for each of the one or more invocations of the function that are included in the XQuery query further comprise instructions which, when executed by the one or more processors, cause the one or more processors to perform:
    for each expression tree stored in the function instantiation cache, generating an execution tree for the function based on said each expression tree; and
    storing each execution tree generated for the function in the function instantiation cache; and
  during the execution of the query, each invocation of the one or more invocations of the function is executed based on the execution tree stored in the function instantiation cache that corresponds to said each invocation.

* * * * *